United States Patent
Manning et al.

[19]

[11] Patent Number: 5,809,192
[45] Date of Patent: Sep. 15, 1998

[54] OPTICAL FIBER CONNECTOR HAVING ENHANCED ASSEMBLY MEANS

[75] Inventors: Randy Marshall Manning, New Cumberland; Thomas Ralph Fawcett, Jr., Harrisburg; Robert Carl Briggs, Newport, all of Pa.

[73] Assignee: The Whitaker Corporation, Wilmington, Del.

[21] Appl. No.: 611,312

[22] Filed: Mar. 5, 1996

Related U.S. Application Data

[63] Continuation of Ser. No. 381,035, Jan. 31, 1995, abandoned, which is a continuation-in-part of Ser. No. 264,124, Jun. 22, 1994, abandoned.

[51] Int. Cl.⁶ .................................................. G02B 6/36
[52] U.S. Cl. .............................. 385/78; 385/76; 385/77
[58] Field of Search ............................... 385/76–81, 86, 385/87

[56] References Cited

U.S. PATENT DOCUMENTS

| | | | |
|---|---|---|---|
| 3,984,174 | 10/1976 | Landgreen | 350/96 C |
| 4,277,135 | 7/1981 | Schrott et al. | 350/96.21 |
| 4,690,494 | 9/1987 | Hirose et al. | 350/96.2 |
| 4,726,647 | 2/1988 | Kakii et al. | 350/96.21 |
| 4,735,480 | 4/1988 | Levinson et al. | 350/96.21 |
| 4,747,656 | 5/1988 | Miyahara et al. | 350/96.2 |
| 4,762,389 | 8/1988 | Kaihara | 350/96.21 |
| 4,936,662 | 6/1990 | Griffin | 350/96.2 |
| 4,964,690 | 10/1990 | Lappohn et al. | 350/96.21 |
| 5,082,344 | 1/1992 | Mulholland et al. | 385/60 |
| 5,142,597 | 8/1992 | Mulholland et al. | 385/56 |
| 5,193,133 | 3/1993 | Schofield et al. | 385/85 |
| 5,212,752 | 5/1993 | Stephenson et al. | 385/76 X |
| 5,214,732 | 5/1993 | Beard et al. | 385/78 |
| 5,222,169 | 6/1993 | Chang et al. | 385/87 |
| 5,224,186 | 6/1993 | Kishimoto et al. | 385/78 |
| 5,230,032 | 7/1993 | Muzslay | 385/66 |
| 5,265,182 | 11/1993 | Hartley | 385/77 |
| 5,265,183 | 11/1993 | Feng et al. | 385/78 |
| 5,283,849 | 2/1994 | Cooke et al. | 385/77 |
| 5,287,425 | 2/1994 | Chang | 385/81 |
| 5,293,582 | 3/1994 | Beard et al. | 385/78 |
| 5,321,784 | 6/1994 | Cubukeiyan et al. | 385/78 |
| 5,337,385 | 8/1994 | Baderschneider | 385/59 |
| 5,337,386 | 8/1994 | Noll et al. | 385/60 |
| 5,341,446 | 8/1994 | Shibata | 385/78 |
| 5,428,703 | 6/1995 | Lee | 385/78 |
| 5,436,995 | 7/1995 | Yoshizawa et al. | 385/86 |

FOREIGN PATENT DOCUMENTS 0 330 399 A1  8/1989  European Pat. Off. .

*Primary Examiner*—Phan T. H. Palmer

[57] ABSTRACT

An optical fiber connector assembly for receiving an optical fiber and reducing transverse offset loss has a ferrule (15) having a plurality of tabs (19) disposed circumferentially thereabout. The ferrule (15) and a compression spring (20) are retainably received in a cable attachment body (25) in one of a plurality of possible rotational orientations to form an assembly (11). Apertures (44) and longitudinal cutouts (42) in the plug body (40) receive retention lugs (35) on the cable attachment body (25). In an FC connector, a plurality of latch beams (67) on the plug body (40) retainably engage an internal retention diameter (71) in an FC coupling nut. The ferrule assembly (11) together with the plug body (40) are assembled to the FC coupling nut (60) using axial motions.

13 Claims, 14 Drawing Sheets

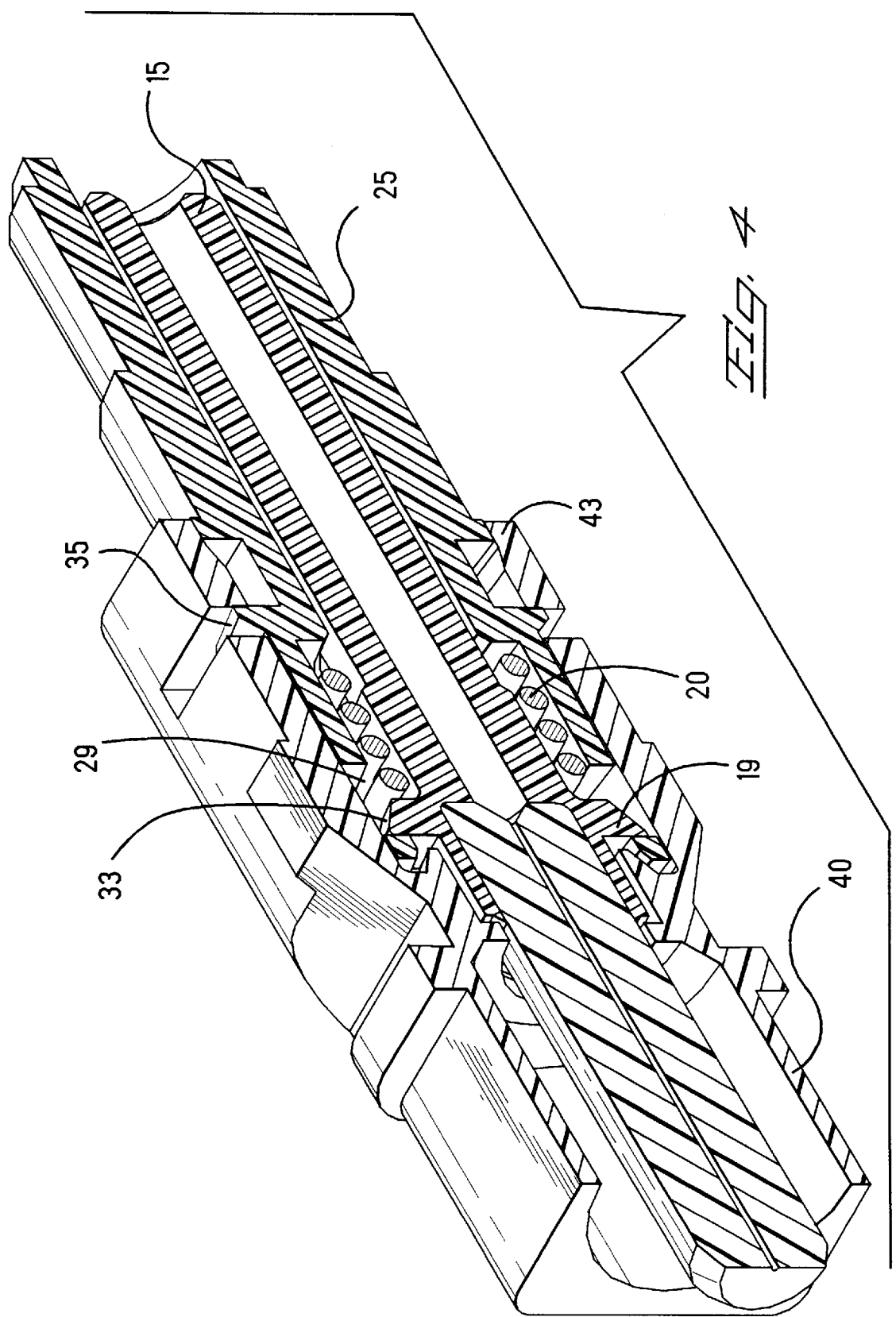

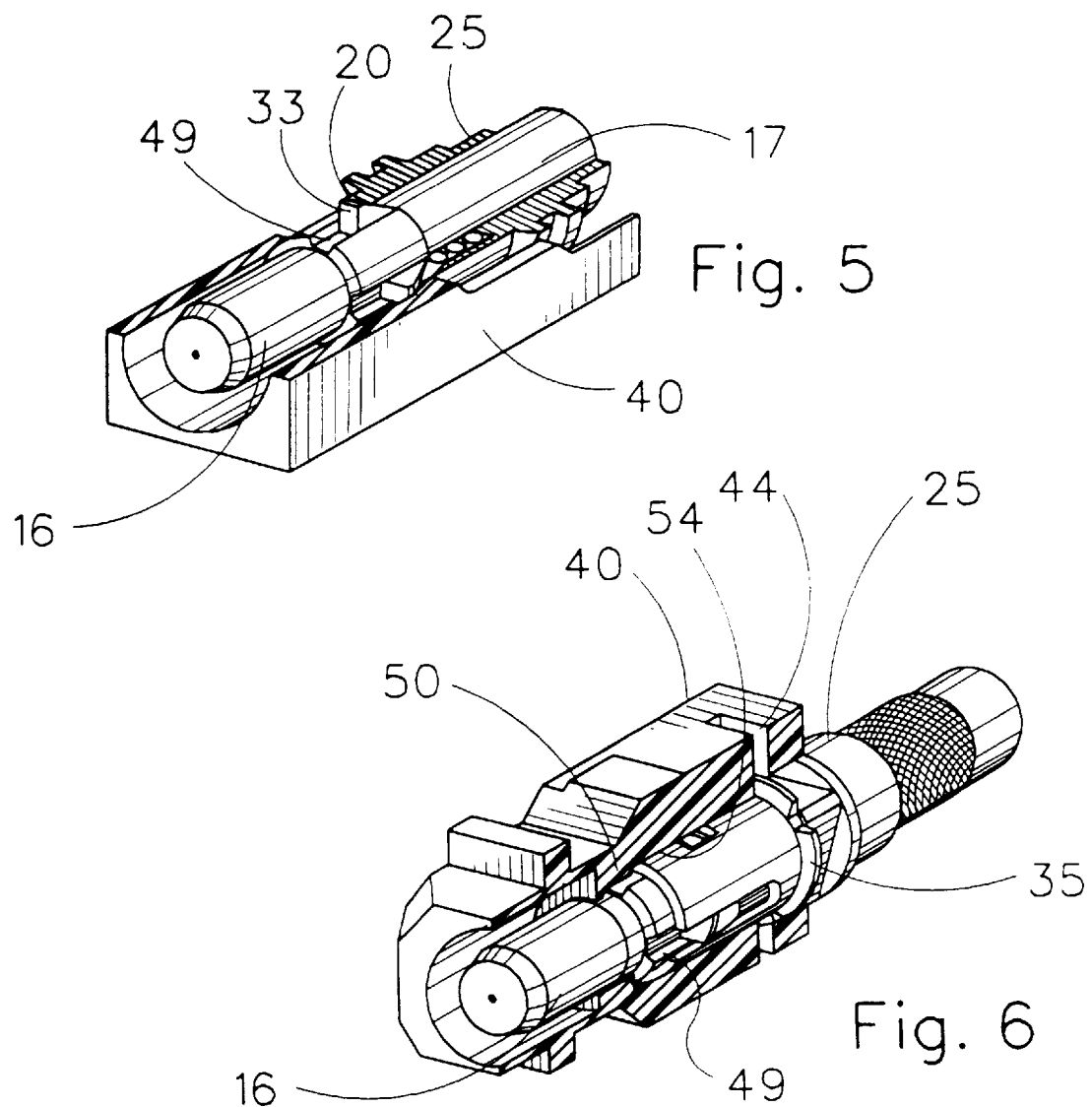

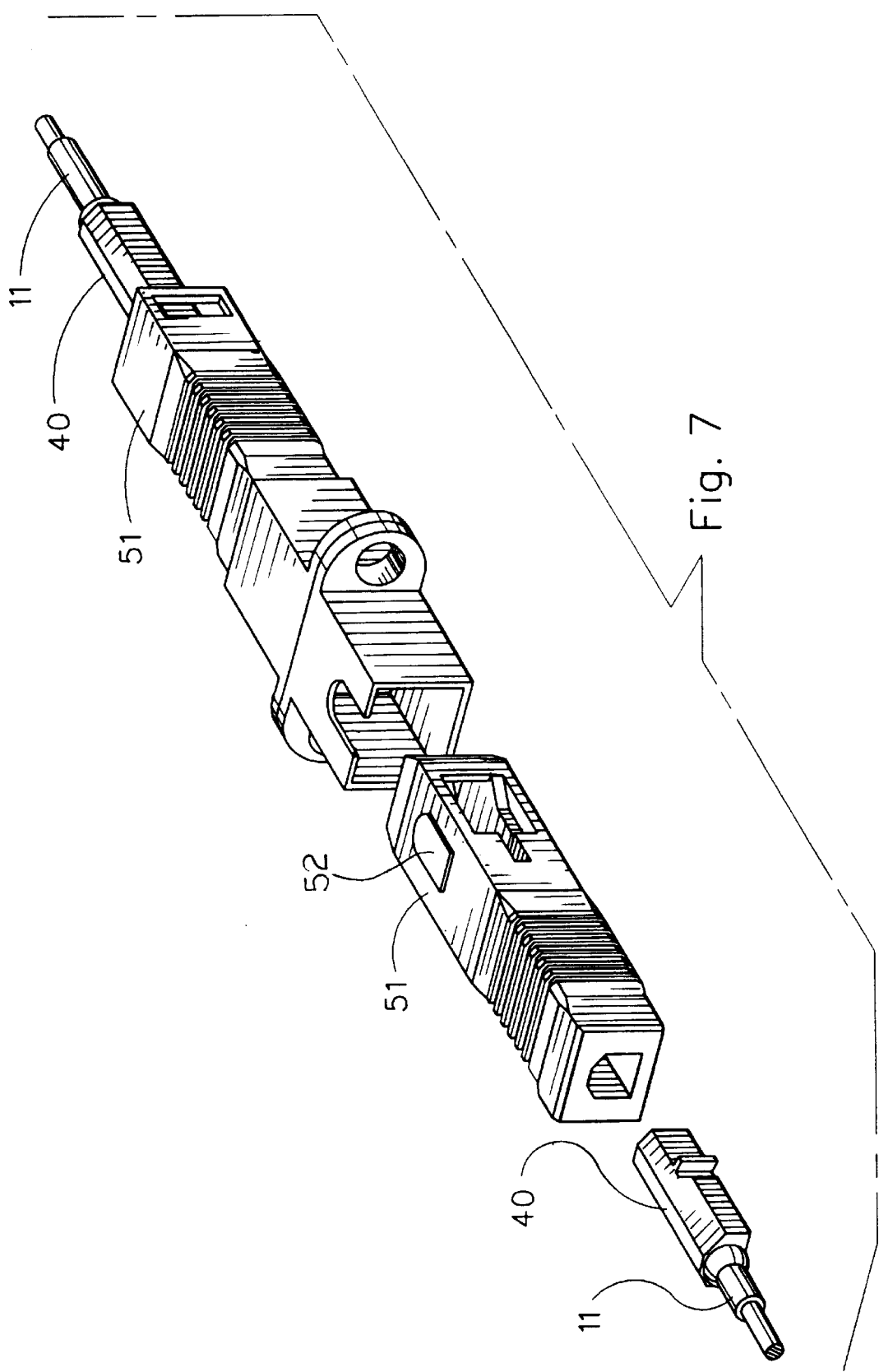

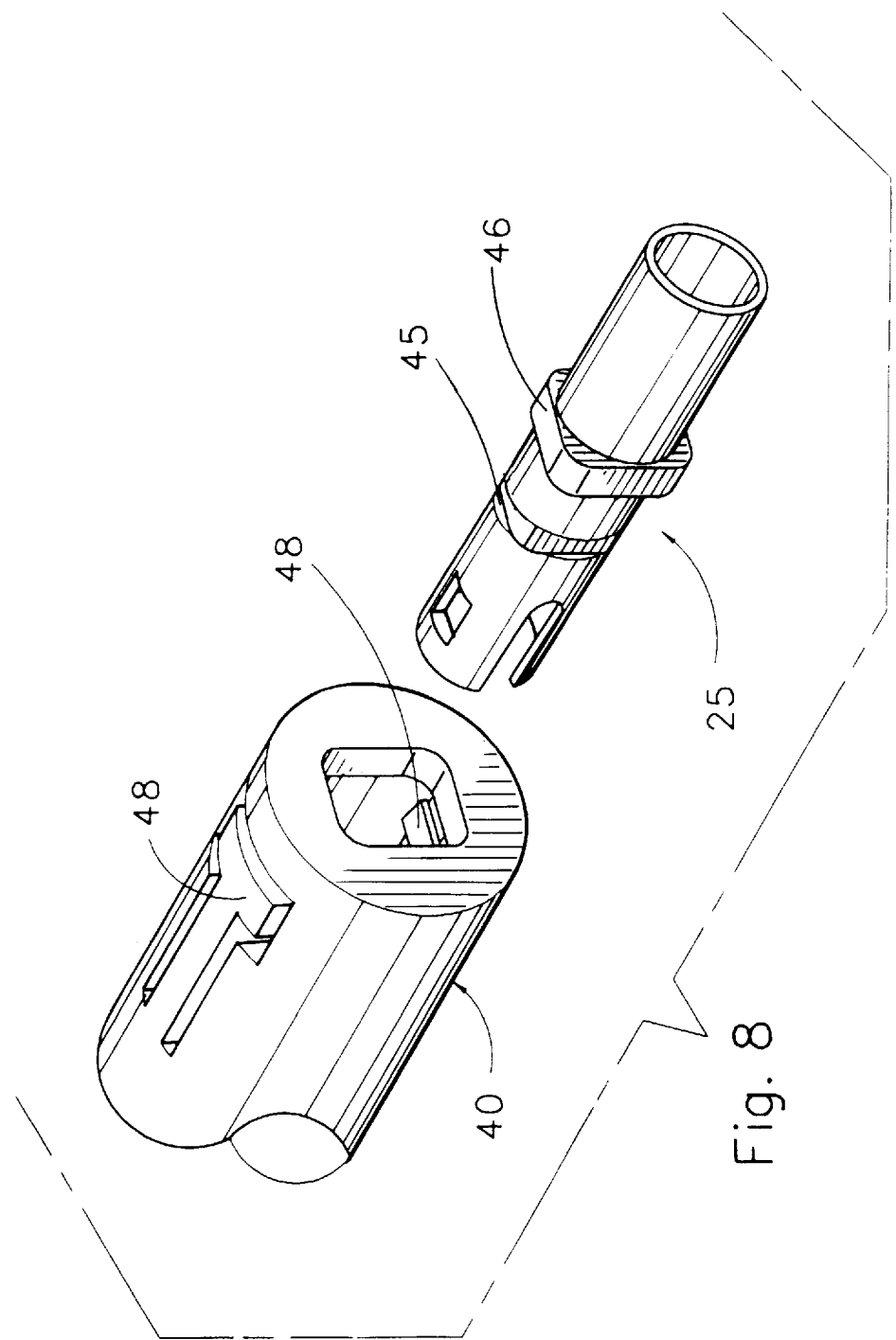

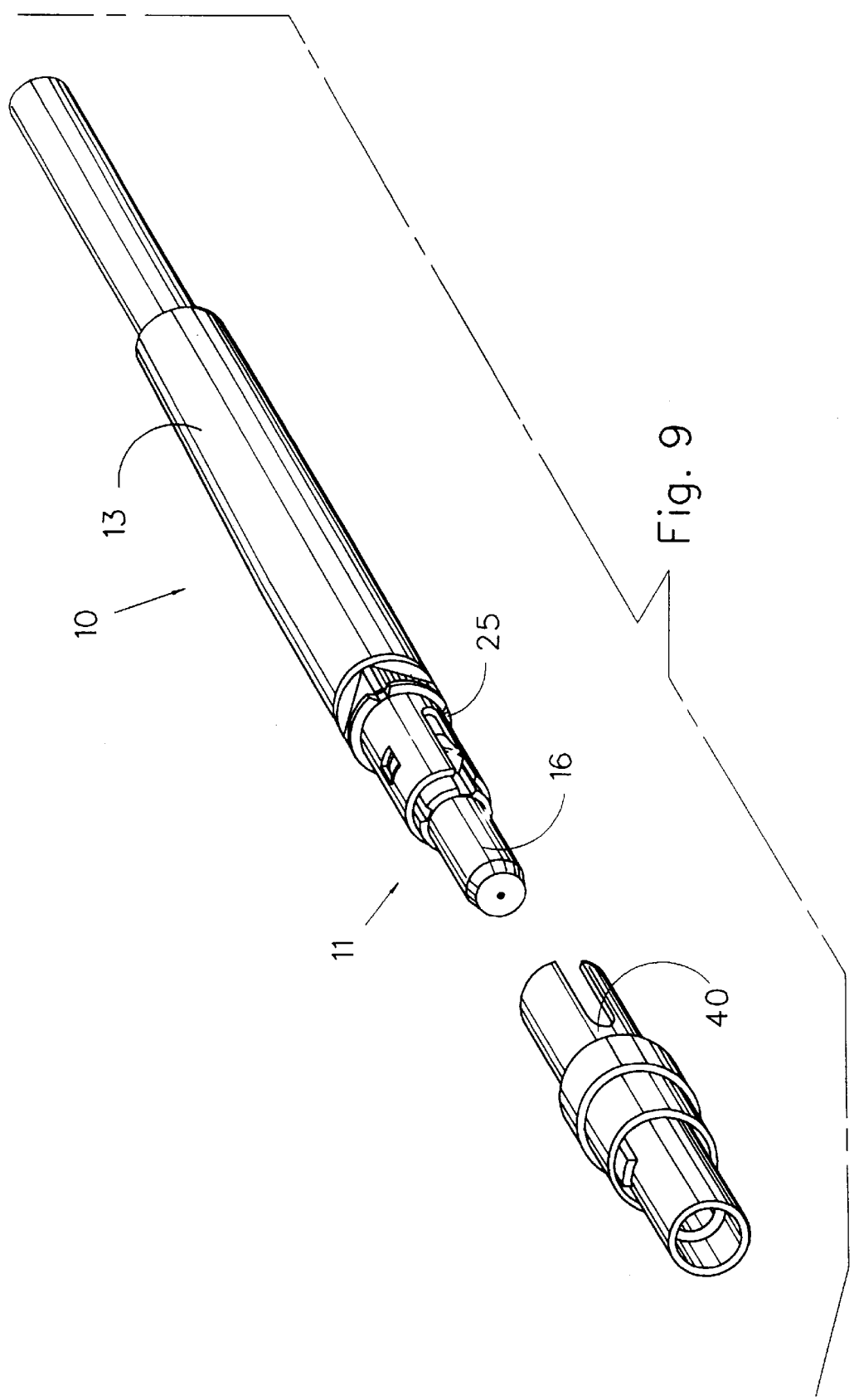

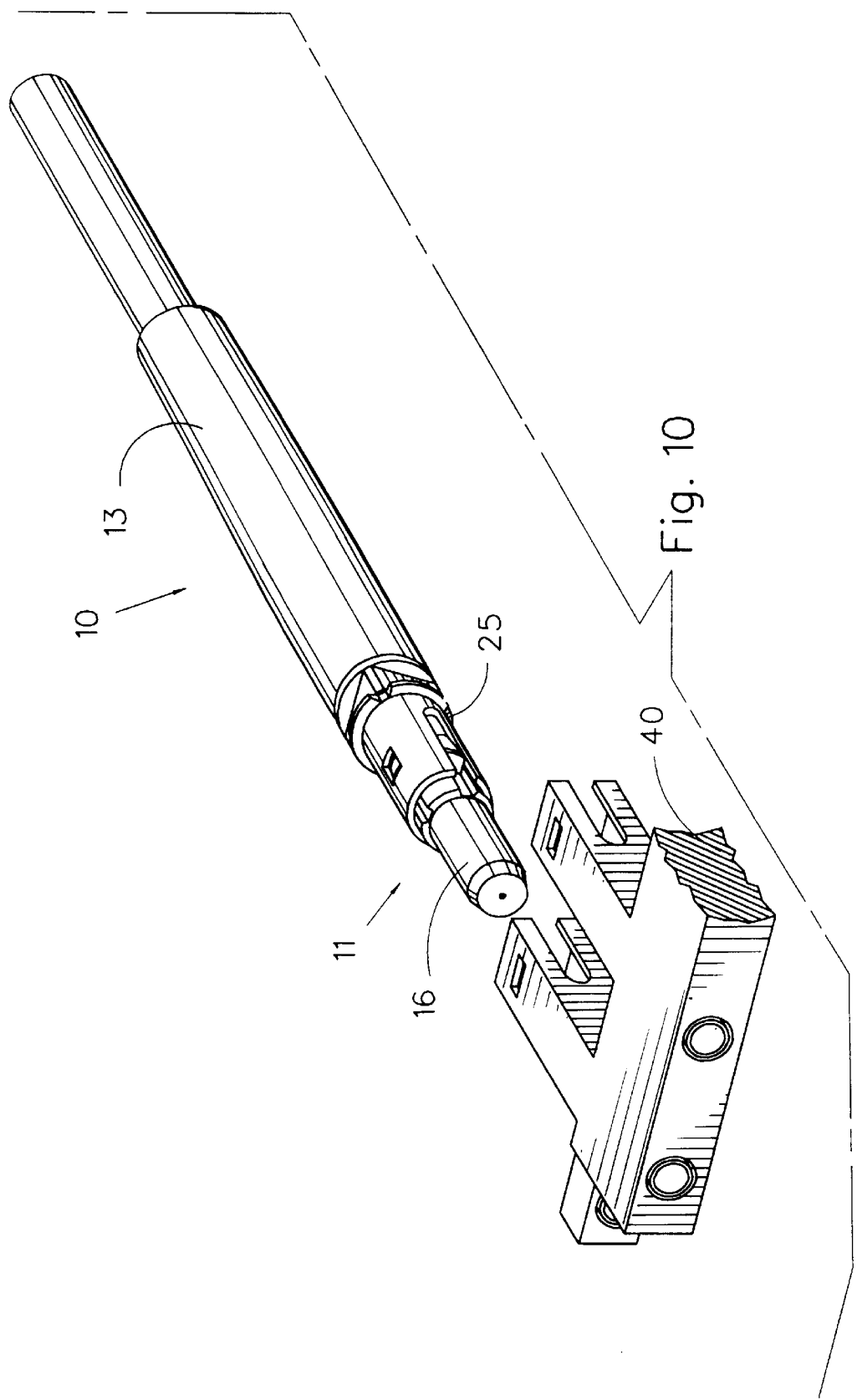

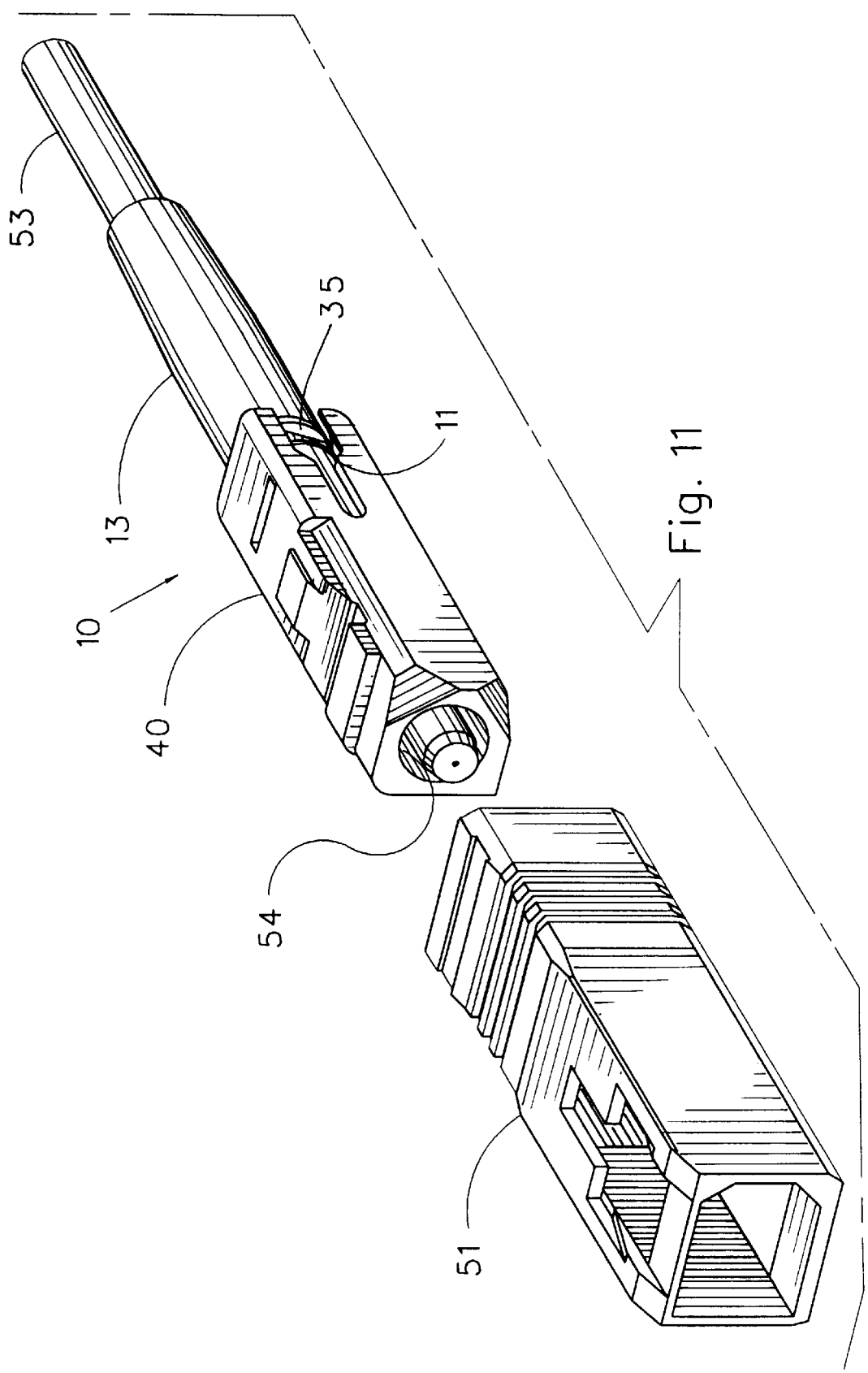

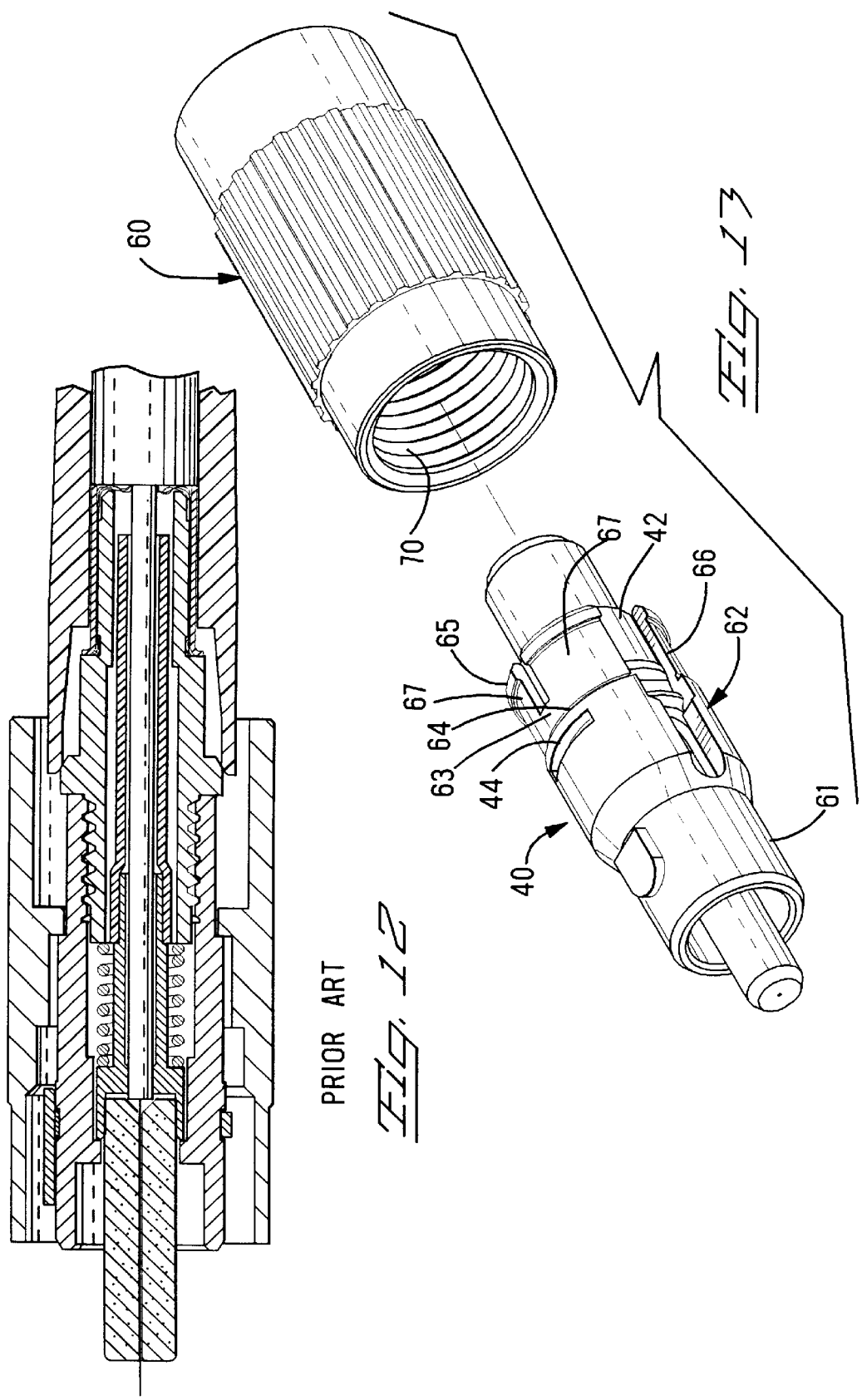

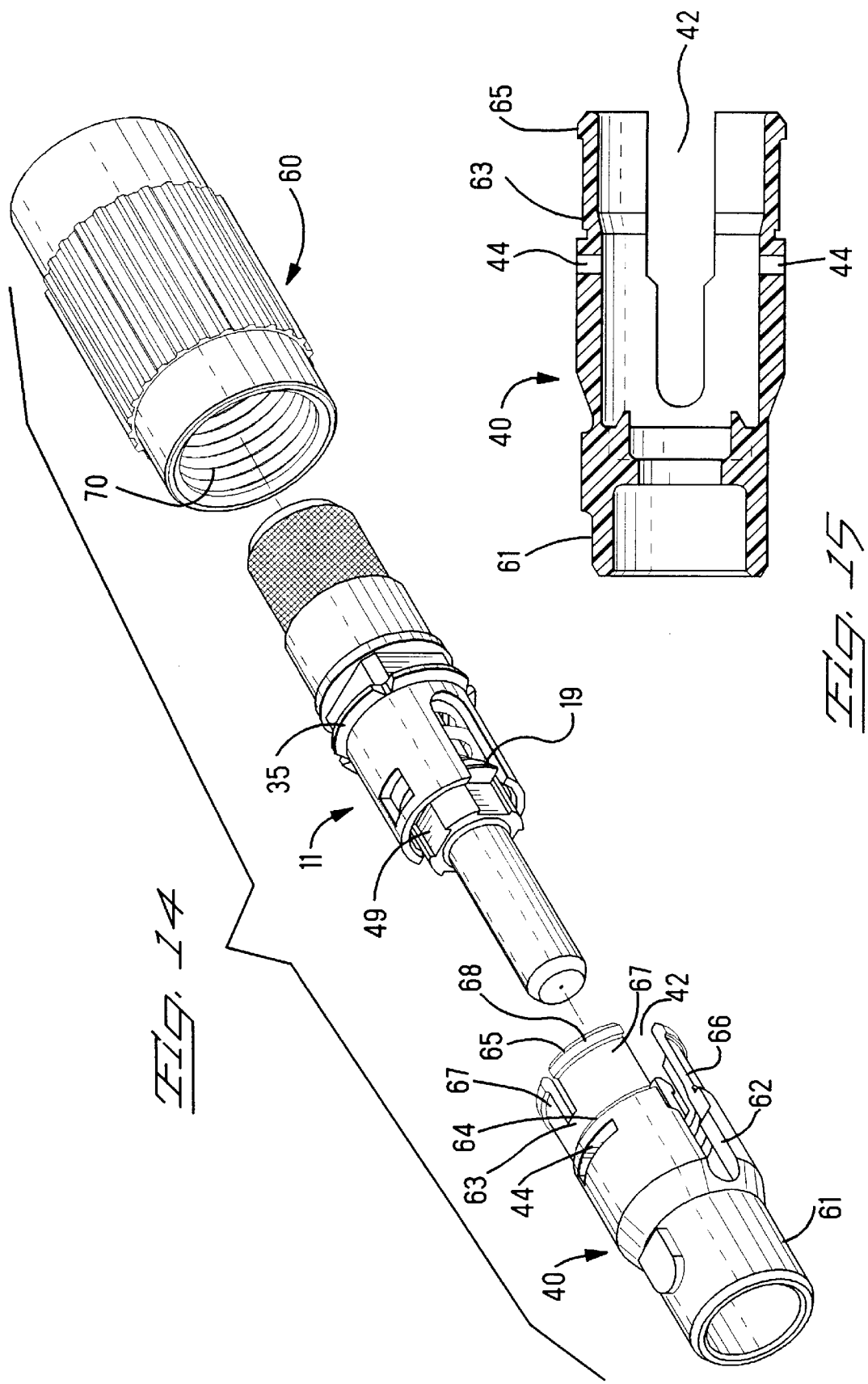

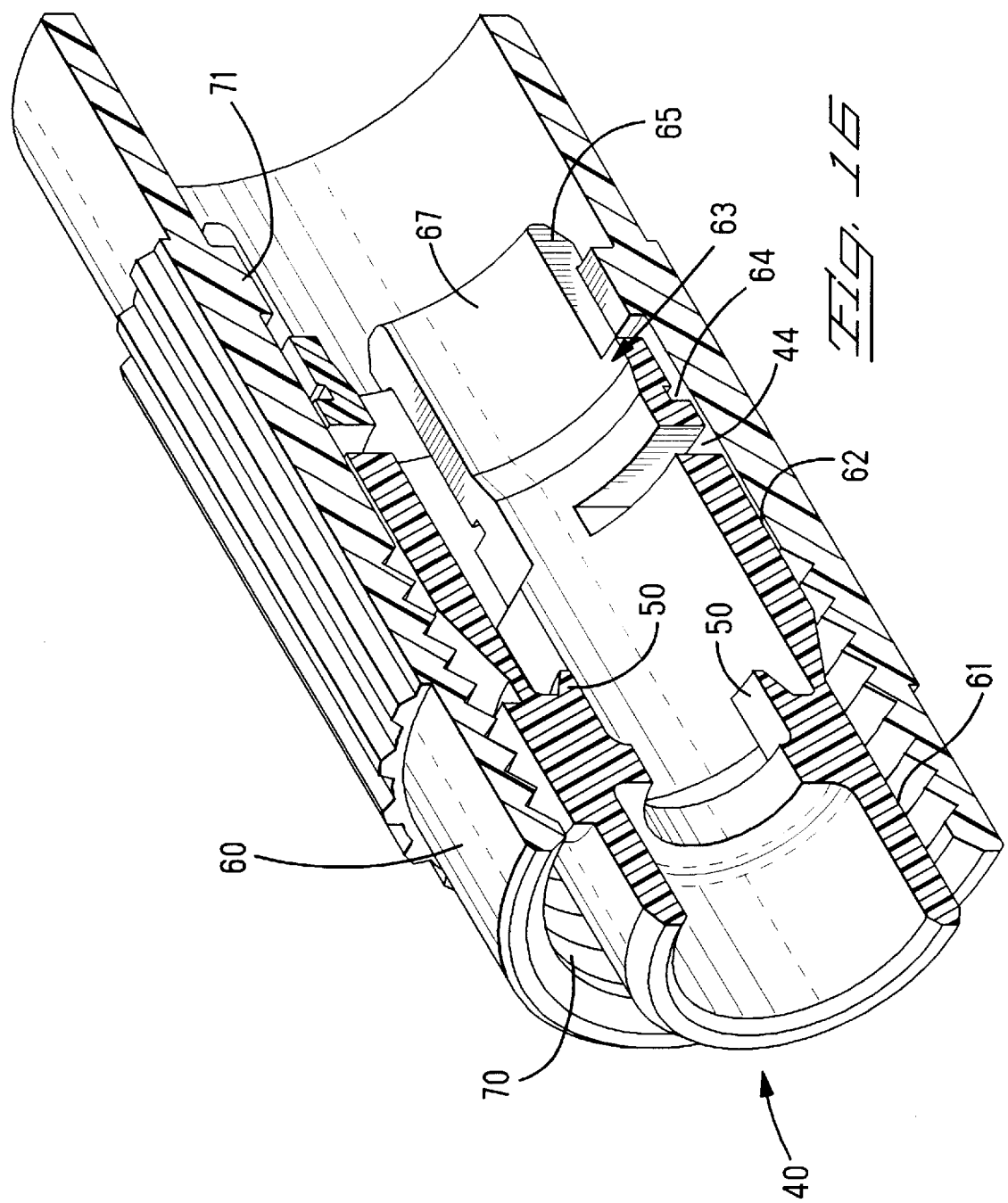

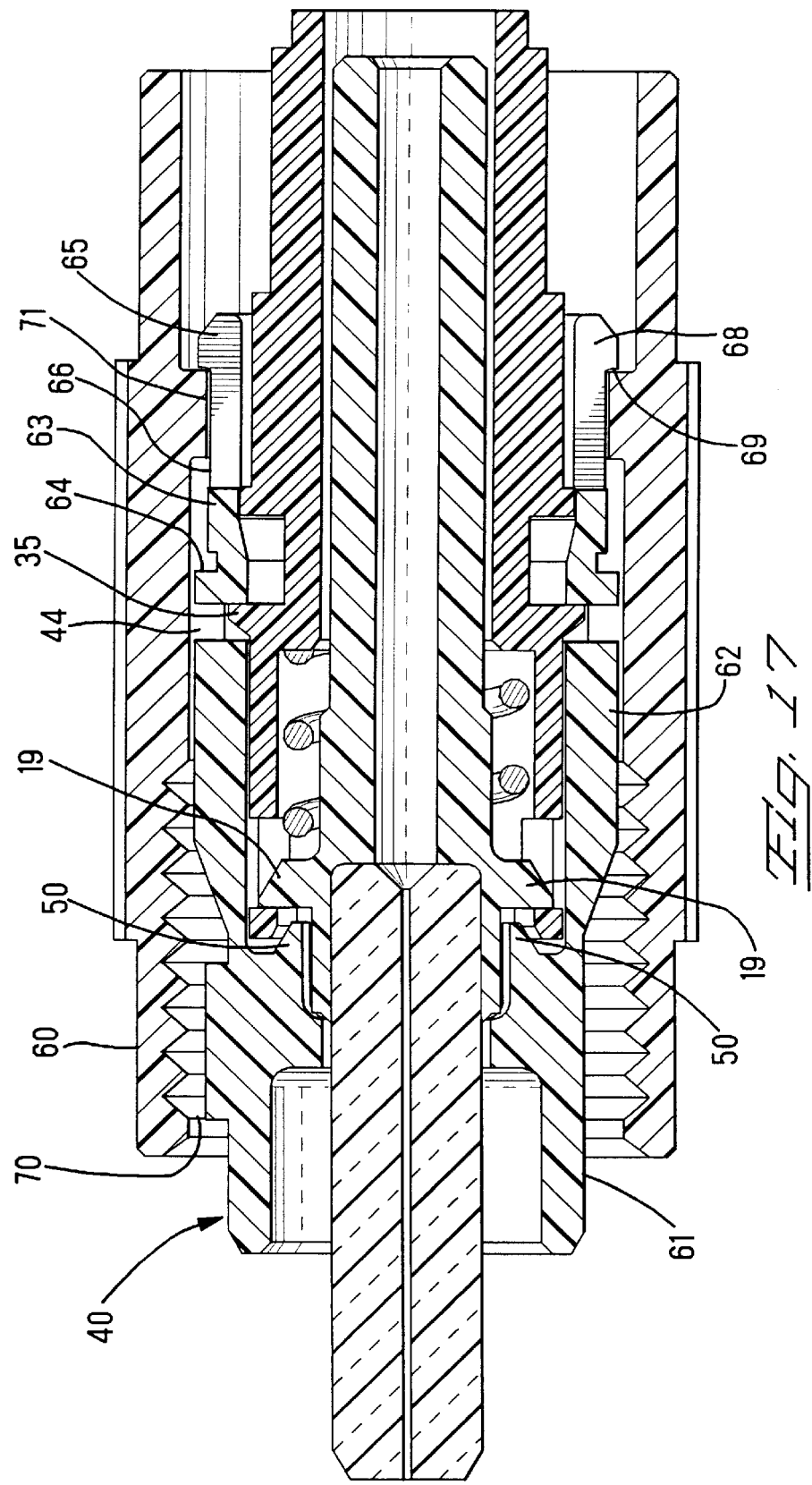

OPTICAL FIBER CONNECTOR HAVING ENHANCED ASSEMBLY MEANS

This is a continuation of patent application Ser. No. 08/381,035 filed Jan. 31, 1995, now abandoned which is a continuation-in-part of patent application Ser. No. 08/264,124, filed Jun. 22, 1994, now abandoned.

FIELD OF THE INVENTION

The present invention relates to an optical fiber connector and, more particularly, to optical fiber connectors having improved assembly features.

BACKGROUND ART

The placement of an optical fiber in a system frequently gives rise to losses due to the disposition and/or eccentricity of the core of the optical fiber. This may be due to the optical core not being centered within the optical fiber, irregularities in the shape of the optical core and/or misalignment of the optical fiber within the optical connector. A further cause of transverse loss is the misalignment or lateral offset of connecting optical fibers. This problem is discussed in "Insertion Loss Improvement Method of Optical Connectors" IEC TC86/SC86B/WG4/IWANO-1 (1993). In order to correct the problem, a direct measurement method and a standard adjustment correction method are considered. The direct measurement method requires precision instrumentation which is costly and time consuming. The standard adjustment connector method is proposed.

A connector directed to this problem is disclosed in U.S. Pat. No. 5,212,752 issued to Stephenson et al. The connector has a plug frame secured to a cable retention member with an unconnected ferrule assembly held between the plug frame and the cable retention member. After the ferrule assembly is assembled with the plug frame, the eccentricity of the optical fiber core is determined. The plug frame is assembled with a grip to align the eccentricity with a key of the grip. This device is directed to an SC connector.

The applicant is also aware of the following U.S. Patents directed to the eccentricity and aligning of optical fibers.

| U.S. Pat. No. | Inventor(s) |
| --- | --- |
| 3,800,388 | Barnes et al |
| 3,963,143 | Sato |
| 4,019,806 | Fellows et al |
| 4,146,300 | Kaiser |
| 4,239,333 | Dakss et al |
| 4,113,346 | Jackson et al |
| 4,579,418 | Parchet et al |
| 4,738,507 | Palmquist |
| 4,738,508 | Palmquist |
| 4,747,659 | Takahasi |
| 4,753,510 | Sezerman |
| 4,856,865 | Lee |
| 5,142,598 | Tabone |
| 5,146,525 | Tabone |
| 5,216,734 | Grinderslev |
| 5,257,333 | Nodfelt |
| 5,282,259 | Grois et al. |

The number of references are indicative of the need in the art to provide a means for properly aligning the optical fibers. While, the above references are all directed to the problem, there still exists a need to terminate an optical fiber cable and to provide a connector which can be easily assembled in the field or at the factory to orient the fiber core to minimize transverse off-set loss.

In order to achieve manufacturing efficiencies of scale, it is desireable to adapt parts utilized in one style of connector to other styles of connectors. There is a need, therefore, to adapt the beneficial features of an SC connector to an FC connector while using as many identical parts as possible. In this way, a large percentage of the connector parts are interchangeable permitting an increase in the manufacturing volume of a single part.

It is also desireable to reduce the manufacturing complexity of a single part. Known FC connectors have threaded rear bodies that captivate a ferrule within a plug body, and simultaneously captivate the plug body and ferrule within the FC coupling nut. While threaded engagement provides a secure ferrule and plug body captivation, the rotational action required for assembly is time consuming and is often done manually. Axial assembly is more efficient manually and is adapted more easily to automated assembly than the threading operation. It is desireable, therefore, to have an FC coupling nut, that can be assembled axially and in a single motion.

A tuned fiber optic connector usually has lower insertion loss than untuned counterparts. All connector styles, therefore, benefit from a tunable capability. The rise in popularity of angle polish connectors also renders tunability beneficial. An angled positive contact ferrule is terminated and tuned prior to polishing the angle onto the ferrule. The handling of the polishing and tuning operations may cause disassembly of the connector parts. There is a need, therefore, for a rugged subassembly that can withstand the handling of the polishing, tuning, and angle polish operations.

SUMMARY OF THE INVENTION

The present invention provides an optical fiber connector assembly which can be easily and axially assembled and provides a positive means for aligning the optical fiber to minimize transverse off-set loss.

It is an object of the present invention to reduce the manufacturing complexity of the FC connector.

It is another object of the present invention to use a number of identical parts for an SC style connector as an FC connector.

It is another object of the present invention to provide for a tunable FC connector.

In accordance with the teachings of the present invention, there is disclosed an optical fiber connector which includes a ferrule and a cable attachment body. The ferrule is retainably engaged within the cable attachment body. The ferrule cooperates with the cable attachment body to resist rotational displacement between the ferrule and the cable attachment body. A receptor member retainably engages the cable attachment body in one of a finite plurality of possible rotational orientations.

In accordance with the teachings of the present invention, a plug body receives a ferrule assembly. The plug body comprises opposing cantilever latch members, biased outwardly. The latch members have a retention shoulder and a latch hook defining a recess therebetween. An FC coupling nut has an internal retention diameter received by said recess.

It is a feature of the present invention that a ferrule, spring, and cable retention member may be handled as a unit that resists disassembly during polishing, tuning, and final assembly operations.

It is a feature of the present invention that a plug body comprises latch members that cooperate with a retention diameter on an FC coupling nut.

It is a feature of the present invention that the parts for the ferrule assembly used in an SC style connector are identical to, and therefore interchangeable with, those used in an FC style connector according to the present invention.

It is a feature of the present invention, that the ferrule assembly is captivated within a plug body in one of a plurality of fixed rotational positions.

It is an advantage of the present invention that the ferrule assembly and plug body are axially assembled to the FC coupling nut.

It is an advantage of the present invention that manufacturing economies of scale may be realized over differing connector styles.

It is an advantage of the present invention that an FC connector is assembled using primarily axial motions, the assembly motions, therefore, lending themselves to efficient assembly and automation.

It is an advantage of the present invention that a fiber optic connector may be tuned to reduce transverse offset loss.

It is an advantage of the present invention that the ferrule assembly resists rotation relative to the plug body.

These and other objects of the present invention will become apparent from a reading of the following specification, taken in conjunction with the enclosed drawings.

BRIEF DESCRIPTION OF THE DRAWINGS

FIG. 4 is a cross-sectional view of the connector assembly showing the ferrule in the cable attachment body and received in the plug body.

FIG. 5 is a cross-sectional view of the plug body, the cable attachment body and the compression spring showing, in perspective, the ferrule, base and tabs disposed therein.

FIG. 6 is a cross-sectional view of the plug body showing, in perspective, the assembly received therein.

FIG. 7 is a perspective view of two assemblies of the present invention coupled together.

FIG. 8 is a perspective view showing an alternate embodiment of the present invention retainably engaging the cable attachment body to the plug body.

FIG. 9 is a perspective view showing the mating of the present invention to a receptor member with a threaded coupling.

FIG. 10 is a perspective view showing the mating of the present invention to a printed circuit board connector.

FIG. 11 is a perspective view showing the mating of the outer housing with the plug body to which the assembly is attached.

FIG. 12 is a cross sectional view of a known FC style connector.

FIG. 13 is a perspective view of an FC style coupling nut and a plug body according to the teachings of the present invention prior to final assembly.

FIG. 14 is an exploded perspective view of a plug body according to the teachings of the present invention and a ferrule assembly prior to assembly with the plug body.

FIG. 15 is a cross section of a plug body according to the teachings of the present invention.

FIG. 16 is a cross section of an FC style coupling nut assembled within a plug body according to the teachings of the present invention.

FIG. 17 is a cross section of an FC style connector according to the teachings of the present invention.

DESCRIPTION OF THE PREFERRED EMBODIMENTS

Figure 1:
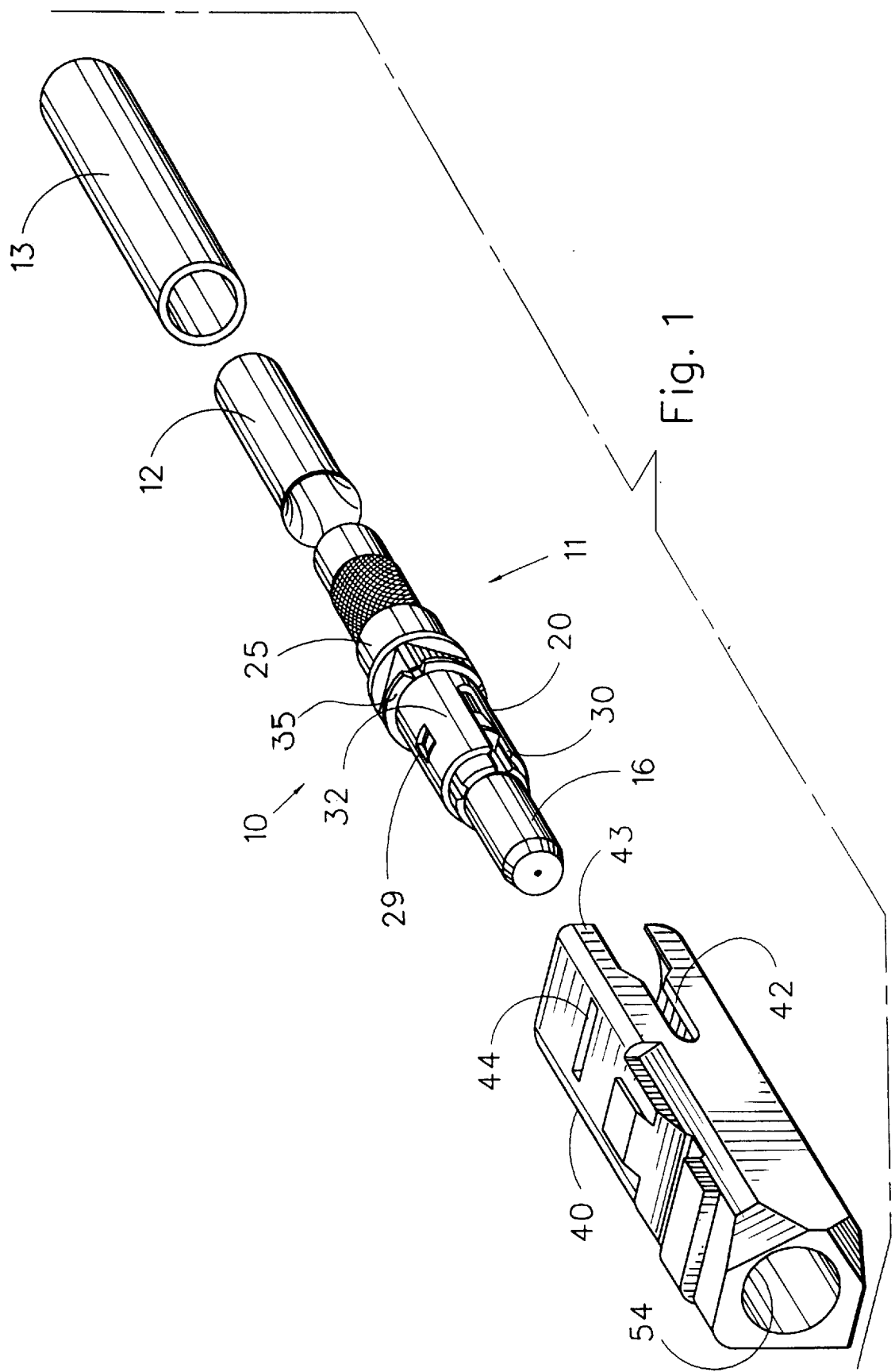
FIG. 1 is an exploded perspective view of the connector assembly of the present invention viewed from the plug body toward the cable retention member.
Figure 2:
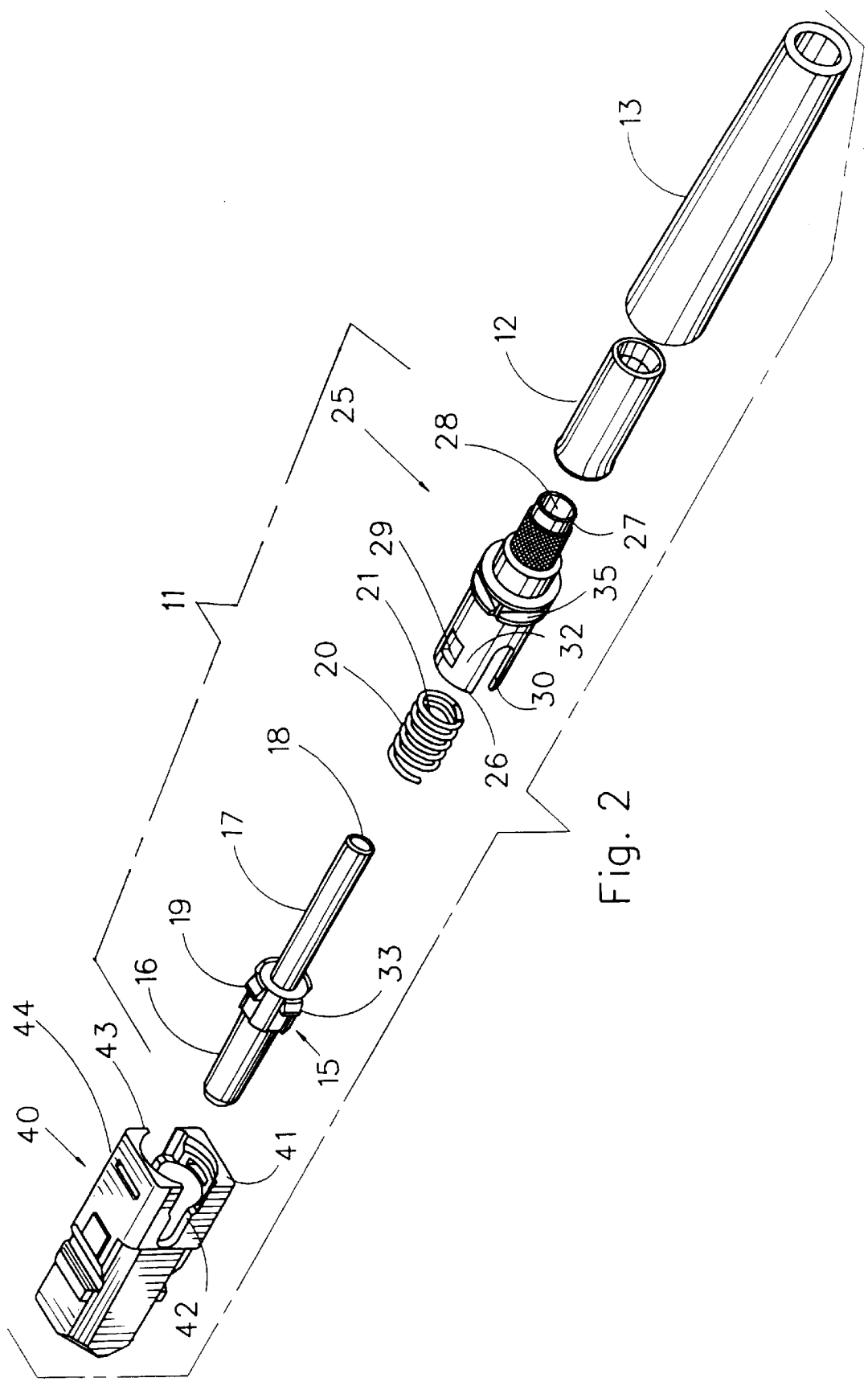
FIG. 2 is an exploded perspective view of the connector assembly of the present invention viewed from the cable retention member toward the plug body.
Figure 3:
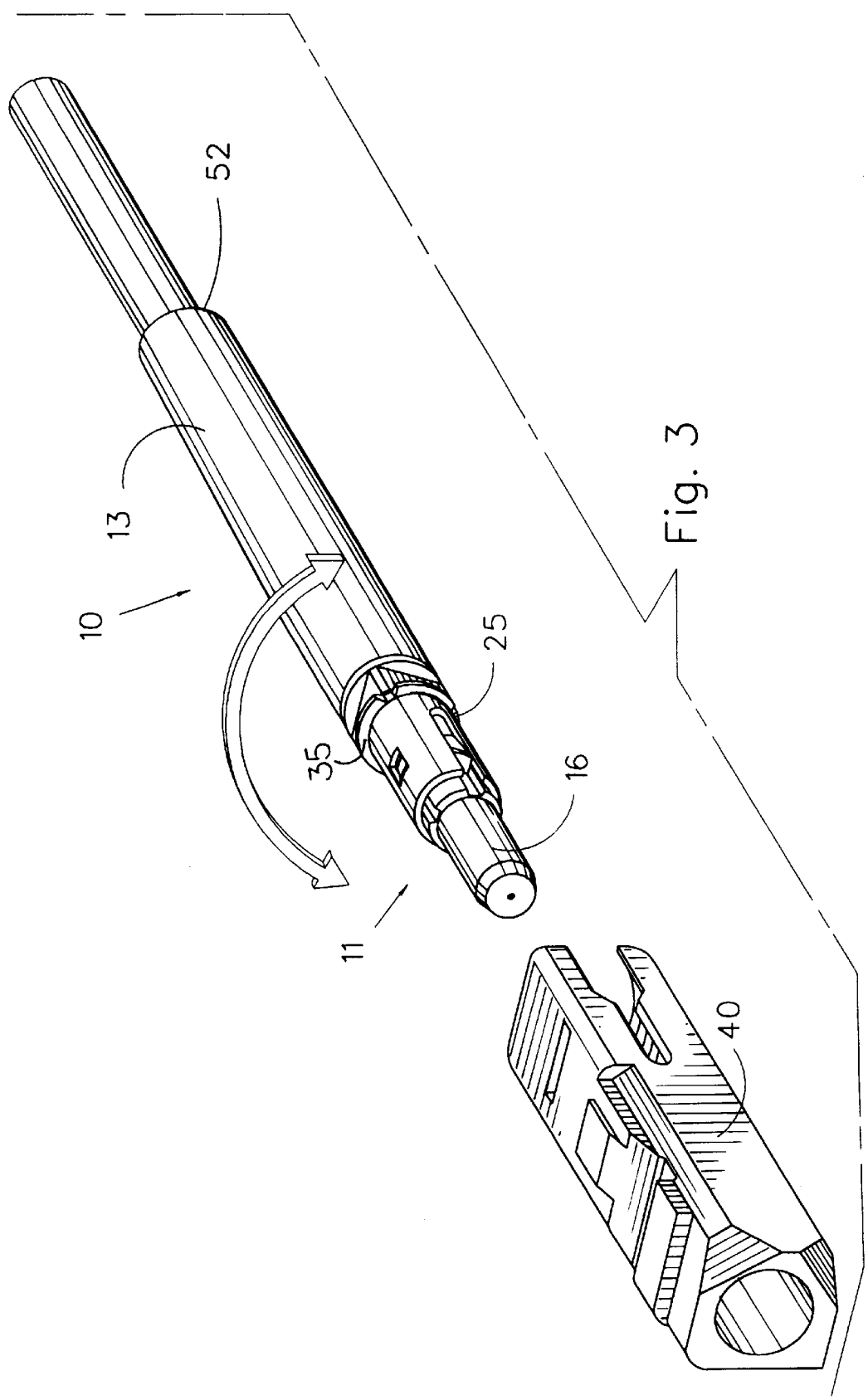
FIG. 3 is a perspective view of the connector assembly of the present invention showing the optical fiber attached to the ferrule assembly and being rotatably oriented and connectable to the plug body.

Referring now to FIGS. 1–6, the optical fiber connector 10 has a ferrule assembly 11 which, at one end is connected to a fiber optic cable with a tubular crimp ring 12 and a tubular cable boot 13, and at the opposite end, is connected to a receptor member. The assembly 11 includes a ferrule 15 which has an alignment portion 16 adjoining a base 17. The alignment portion 16 is joined end to end with the base 17 along a longitudinal axis. A longitudinal bore 18 extends through the alignment portion 16 and the base 17 along the longitudinal axis. The optical fiber is received in the longitudinal bore 18. At approximately the juncture of the alignment portion 16 and the base 17, there is formed a first retention member which in a preferred embodiment is an enlarged section on which are formed a plurality of spaced-apart tabs 19. The tabs 19 are formed circumferentially around the ferrule 15 and extend outwardly therefrom substantially perpendicularly to the longitudinal axis. Preferably, a coiled compression spring 20 having a center opening 21 is disposed with the base 17 being received in the opening 21 in the compression spring 20 such that the coiled compression spring 20 is around the base 17.

The ferrule 15 with the compression spring 20 is received in a cable attachment body 25. The cable attachment body 25 has a first end 26 oriented toward the ferrule 15 and a second, opposite end 27 oriented toward the crimp ring 12 and cable boot 13. A longitudinal bore 28 is formed on a longitudinal axis between the first end 26 and the second end 27. The cable attachment body 25 has a second retention member which in a preferred embodiment is a plurality of spaced-apart openings 29 formed near the first end 26 of the cable attachment body 25 extending through the cable attachment body 25 and communicating with the longitudinal bore 28. A corresponding plurality of spaced-apart longitudinal slots 30 are formed in the cable attachment body, each slot extending through the cable attachment body 25 and communicating with the longitudinal bore 28. Further, each longitudinal slot 30 is disposed between a respective pair of openings 29 so that a plurality of alternating longitudinal slots 30 and openings 29 are formed at the first end 26 of the cable attachment body 25.

The ferrule 15 is mated with the cable attachment body 25 by inserting the base 17 with the compression spring 20 thereabout into the first end 26 of the cable attachment body 25 so that the base 17 is disposed in the longitudinal bore 28 of the cable attachment body 25. The projecting tabs 19 on the ferrule 15 are aligned with corresponding openings 29 and longitudinal slots 30 in the cable attachment body 25. As the ferrule 15 is inserted into the cable attachment body 25, every other tab 19 is received in the respective longitudinal slots 30 and the remaining (and alternating) tabs 19 engage the walls 32 (or beams) of the cable attachment body 25 which are formed between the longitudinal slots 30. Each tab 19 on the ferrule 15 has a chamfer 33 which deflects the respective beams 32 outwardly from the longitudinal bore 28 in the cable attachment body 25 as the ferrule 15 and the cable attachment body 25 are moved axially. This allows the ferrule assembly 1 to be received in the cable attachment body 25. The first end 26 of the cable attachment body 25 has a chamfer complementary to the chamfer 33 on the tabs 19 to facilitate initial deflection of the beams 32. The tabs 19 are received in the respective openings 29 with a positive fit and the deflected beams 32 return to the undeflected position. In this manner, the ferrule 15 is retained in the cable attachment body 25 by the urging of the compression spring 20. It is preferred that four tabs 19 be formed on the ferrule 15, each being approximately 90° apart. Correspondingly, it is preferred that two longitudinal slots 30 spaced apart by 180° and two openings 29, each spaced 90° from the longitudinal slots 30, be formed on the cable attachment body 25.

The portion of the longitudinal bore 18 in the base 17 preferably has a larger diameter than the portion of the longitudinal bore 18 in the alignment portion 16. The optical fiber is received in the bore in the alignment portion 16 whereas the optical fiber together with coating for the optical fiber is received in the bore in the base 17. Adhesive may also be introduced into the bore in the base 17 to retain the optical fiber in a desired position. Alternately the optical fiber cable may be mechanically attached to the ferrule 15.

The assembly 11 formed of the ferrule 15, the compression spring 20 and the cable attachment body 25 is handled as a single piece. It may be factory assembled and delivered as a unit or it may be supplied in component form and assembled prior to termination to an optical fiber cable. The assembly 11 is simple to assemble and is cost effective, providing a marketing advantage for the present invention. The optical fiber at the end of the alignment portion 16, distal from the cable attachment body 25 is finished by conventional procedures including cleaving, abrasive polishing or thermal polishing. The assembly 11 terminated with the optical fiber cable may be tested against another terminated fiber connection with an optical fiber core of known eccentricity and angular orientation. The preferred orientation of the fiber core may be identified by such a test procedure. Each unit may be individually tested and oriented or may be oriented with respect to one another. It is preferred that assemblies, and the optical fibers incorporated in each, be oriented in a sector at either 0° or 180° with respect to a keying feature or line of symmetry in order to most efficiently minimize transverse offset loss.

Formed on the cable attachment body 25 at approximately the midpoint between the first end 26 and the second end 27, are a plurality of spaced-apart retention lugs 35. The retention lugs 35 extend outwardly from the cable attachment body 25 and are approximately perpendicular to the longitudinal axis of the cable attachment body 25. Preferably there are four retention lugs 35 which function in diametrically opposed pairs, each pair being substantially at a right angle to the other pair.

The cable attachment body 25 of the assembly 11 is connected to a receptor member by the retention lugs 35. One type of receptor member is a plug body 40. The plug body 40 has a longitudinal passageway 54 formed therein and has a first end which has a plurality of spaced-apart longitudinal cut outs 42 formed therein. The longitudinal cut outs 42 communicate with the longitudinal passageway 54. The walls of the plug body 40 between the longitudinal cut outs 42 act as resilient beams 43 such that a plurality of alternating cut outs 42 and beams 43 are formed on the first end 41 of the plug body 40. An aperture 44 is formed in each beam 43, each aperture 44 communicating with the longitudinal passageway 54 in the plug body 40. The assembly 11 is inserted in the plug body 40 such that the retention lugs 35 deflect the corresponding resilient beams 43 and the respective retention lugs 35 drop into the respective apertures 44 in the respective resilient beams 43. The resilient beams 43 return to the undeflected position and lock the respective lugs 35 in place thereby connecting the cable attachment body 25 of the assembly 11 to the plug body 40. Concurrently, the respective longitudinal cut outs 42 in the first end 41 of the plug body 40 receive the corresponding retention lugs 35. In the present invention, the ferrule 15 portion of the assembly 11 is disposed between the cable attachment body 25 and the plug body 40 and has no direct connecting means with the plug body 40. The connection between the retention lugs 35 on the cable attachment body 25 and the aperture 44 in plug body 40 is a rotatable connection in that the orientation therebetween can be rotated circumferentially. In this manner, any desired retention lug 35 may be connected to any desired aperture 44 (FIG. 3) with the corresponding orientation and rotation of the adjacent retention lug 35 with respect to a selected cut out 42 to define a sector. This rotatable orientation and connection permits the optical fiber core to be oriented into a selected sector. In a preferred embodiment, the cable attachment body 25 has four retention lugs 35 and the plug body 40 has two diametrically opposed beams 43 and two diametrically opposed cut outs 42 between the beams 43. Thus, the cable attachment body 25, and consequently the ferrule 15 having the optical fiber core, can be oriented with respect to the plug body 40 into a selected one of four sectors, each sector being approximately 90° from the adjoining sector.

In an alternate embodiment (FIG. 8), the cable attachment body 25 is formed with a shoulder 45 and a polygonal outer body portion 46. The receptor member (or plug body) 40 has a first end 41 which has a corresponding polygonal opening 47 therein communicating with the longitudinal passageway 54 in the receptor member 40. At least one, and preferably two or more, resilient locking latches 48 are formed in the walls of the receptor member 40 adjacent to the polygonal opening 47. The assembly 11 is inserted into the longitudinal bore in the receptor member 40 and the locking latch 48 engages the shoulder 45 on the cable attachment body 25 which acts as a latch surface, and retains the assembly 11 to the receptor member 40. The polygonal opening 47 on the receptor member 40 cooperates with the polygonal outer body portion 46 of the cable attachment body 25 such that rotational movement is resisted between the receptor member 40 and the assembly 11. The alignment between the receptor member 40 and the assembly 11 may be selected by rotation of these components prior to engagement. In this manner, one of a plurality of possible rotational orientations can be selected corresponding to the sides of the polygonal outer body portion 46 and the sides of polygonal opening 47 on the receptor member 40. Thus, transverse offset loss can be minimized by selective rotation of the assembly 11 with respect to the receptor member 40. It is preferred that the polygon be a square but other multisided configurations may be used.

The connection and rotation are selected to reduce transverse offset loss. The cable attachment body 25 of the assembly 11 may be oriented and connected with different types of receptor members 40 such as a plug body with a threaded coupling (FIG. 9) or a printed circuit board connector (FIG. 10).

In order to further limit rotation of the ferrule 15 within the assembly 11, a plurality of spaced-apart keyways 49 are formed circumferentially on the ferrule 15 near the juncture of the alignment portion 16 and the base 17. At least one, and preferably a corresponding plurality, of keys 50 are formed within the plug body 40. The keyways 49 and keys 50 are disposed so that the respective keys 50 are received in corresponding keyways 49 when the assembly 11 is received in the plug body 40. The keys 50 and keyways 49 are disposed in sectors as described and the keys 50 are received in respective keyways 49 when the assembly 11 is rotatably received in the plug body 40.

In order to further simplify the desired orientation to reduce transverse effect loss, an outer housing 51 is disposed over the receptor member (such as the plug body 40). The outer housing 51 has an orientation key 52 formed thereon (FIG. 7). The orientation key 52 is used as a reference for rotation and orientation of the assembly 11 with respect to the receptor member.

The cable attachment body 25 may be made of plastic or metal and may be manufactured by injection molding, die casting or screw machining methods. Typically, the alignment portion 16 is ceramic but may be made from polymer or metal.

In order to provide mechanical protection for the optical fiber cable 53, the exposed cable strength members are fanned over the knurled second end 27 of the cable attachment body 25 and the crimp ring 12 is crimped about the cable attachment body 25 and jacket of the optical fiber cable 53. The crimp ring 12 connects the optical fiber cable 53 with the cable attachment body 25. The cable boot 13 is slid over the crimp ring 12 and extends outwardly from the cable attachment body 25.

The method of assembling the optical fiber connector to reduce transverse offset loss is to insert the base 17 in the opening 21 in the compression spring 20. The ferrule 15 with the compression spring 20 is inserted into the longitudinal bore 28 in the cable attachment body 25. A plurality of tabs 19 on the ferrule assembly 15 are connected to the corresponding plurality of openings 29 in the cable attachment body 25. The optical fiber is inserted in the longitudinal bore 18 in the base 17 and the alignment portion 16. The optical fiber may be retained within the ferrule 15 either mechanically or adhesively. The optical fiber at the end of the alignment portion 16 is finished by cleaving and polishing. The components form an assembly 11, the basis of the present invention, which is tested for eccentricity. A crimp ring 12 and cable boot 13 may be connected to the second end 27 of the cable attachment body 25 to secure the optical fiber cable 53.

The basic assembly 11 is connected to a receptor member such as a plug body 40. Retention lugs 35 on the cable attachment body 25 are rotatably connected to openings 44 in the plug body 40. In an alternate embodiment, the assembly 11 is selectively rotated with respect to the plug body 40 and the components are engaged with the locking latch 48 on the plug body 40 engaging the shoulder on the cable attachment body 25. The square opening 47 on the plug body 40 cooperates with the square outer body portion 46 of the cable attachment body 25. The assembly 11 is oriented with respect to the plug body 40 to reduce transverse offset loss.

An outer housing 51 may further be disposed over the plug body 40. The outer housing 51 has an orientation key 52 formed thereon to assist in orienting the assembly 11 to reduce transverse offset loss. The device of the present invention may be used with various types of connectors and is not limited to SC connectors.

With specific reference to FIGS. 13 through 17 of the drawings, an FC style connector embodiment of the present invention comprises the plug body 40 that latches to an FC style coupling nut 60. The plug body 40 is substantially cylindrical with a forward portion 61 and a rearward portion 62. The outer diameter of the forward portion 61 is smaller than the outer diameter of the rearward portion 62, and has an orientation key thereon as is conventional in the FC connector. The embodiment of a plug body 40 for an FC style connector according to the teachings of the present invention has apertures 44 and longitudinal cut outs 42 as in the SC embodiment that retainably engage lugs 35 of the ferrule assembly 11. Additionally, the plug body 40 for the FC style connector has two opposing latch members 63. Each latch member 63 comprises a retention shoulder 64 and a latch hook 65 defining a recess 66 therebetween. Each latch merger 63 has a longitudinal slice defining a pair of independently cantilevered latch beams 67. Each latch beam 67 has a latch hook 65 thereon. The latch hook 65 comprises a latch cam surface 68 and a latch shoulder 69. The cooperating FC style coupling nut 60 has a threaded mating portion 70 of the connector as is conventional. The FC style coupling nut further has an area of increased annular thickness creating a reduced inner diameter portion of the coupling nut termed an internal retention diameter 71. The width of the retention diameter 71 is less than the width of the recess 66.

Assembly of the FC connector according to the present invention for a tuned or untuned connector comprises first threading the strain relief boot 13, the crimp eyelet 12, the coupling nut 60 over an unterminated fiber optic cable. The ferrule 15, the spring 20, and the cable attachment body 25 are assembled into a ferrule assembly 11 according to the disclosure hereinabove. The fiber is stripped and terminated to the ferrule assembly 11. This terminated ferrule assembly 11 may be handled and oriented as a unit to make measurements necessary for tuning. Due to the retainable engagement of the ferrule 15 and the cable attachment body 25 which captivates the spring 20, the ferrule assembly 11 advantageously resists disassembly during such handling. When the proper orientation is ascertained, the rear portion 62 of the plug body 40 is brought over the mating end of the ferrule assembly 11. The ferrule assembly 11 is inserted into the plug body 40 in a fixed rotational orientation, the retention lugs 35 resting within apertures 44, and tabs 19 falling within the longitudinal cut outs 42. When the ferrule assembly 11 is retainably disposed within the plug body 40, keys 50 fit within keyways 49 to resist rotation of the ferrule 15 relative to the plug body 40. The plug body 40 retainably engages the ferrule assembly 11 and may be handled as a unit. The mating end 70 of the coupling nut 60 passes over the rearward portion 62 of the plug body 40. As the latch cam surfaces 68 engage the retention diameter 71 the latch beams 67 deflect inwardly. The inward deflection permits the latch hook 65 to pass the retention diameter 71. As the latch shoulder 69 frees the retention diameter 71, the latch beams 67 return to their undeflected state. The retention diameter 71 is, therefore, received within the recess 66. The retention shoulder 64 and the latch shoulder 69 interferes with opposite ridges of the retention diameter 71 to prevent the plug body's 40 release from the FC coupling nut and captivates the plug body 40 and tuned ferrule assembly 11.

Assembly of the FC connector according to the present invention for a preassembled untuned connector comprises assembling the ferrule assembly 11, assembling the plug body 40 to the ferrule assembly 11, and bringing the mating end 70 of the FC style coupling nut 60 over the rear portion 62 of the plug body 40 assembled to the ferrule assembly 11 and then the front portion 61 until the retention diameter 71 is received within the recess 66. An advantage of the untuned, preassembled embodiment lies in the fact that the ferrule assembly 11 retainably engages the plug body 40, and the plug body 40 retainably engages the coupling nut 60. Retainable engagement of the parts during intermediate assembly steps reduces the possibility of inadvertant disassembly during the manufacturing and assembly process.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. A fiber optic connector comprising:
a ferrule assembly having an outwardly extending retention lug, a plug body having a retention aperture receiving said lug and having opposing cantilever latch members biased outwardly, said latch members having a retention shoulder, each said latch member comprising independently cantilevered latch beams, each latch beam having a latch hook thereon defining a respective recess between said respective latch hook and said retention shoulder and an external body having an internal retention diameter received by said recess.

2. The fiber optic connector as recited in claim 1 wherein, said latch beams are comprised of a latch member having a longitudinal slice thereon said slice being shorter than said single beam.

3. An optical fiber connector comprising:
a ferrule,
a cable attachment body retainably engaging said ferrule, said cable attachment body having a plurality of spaced-apart retention lugs thereon, said retention lugs extending outwardly from the cable attachment body, and
a receptor member having a plurality of alternating spaced-apart apertures and longitudinal cutouts therein, each respective adjacent lug in the cable attachment body being received in the corresponding aperture and longitudinal cutout in the receptor member, the receptor member retainably engaging said cable attachment body in one of the finite plurality of possible rotational orientations.

4. An optical fiber connector as in claim 3, wherein said spaced-apart longitudinal cutouts form a corresponding plurality of cantilevered beams therebetween, one said aperture being on each said beam, said apertures being placed so that two of said retention lugs deflect two of said beams and each said retention lug is received in respective apertures in each said beam when said receptor member receives said cable attachment body.

5. An optical fiber cable assembly comprising:
a ferrule having a first retention member and having a longitudinal bore therethrough, an optical fiber cable disposed within said bore, a cable attachment body having a second retention member cooperating with said first retention member to retainably engage and prevent rotational displacement between said ferrule and said cable attachment body and, a receptor member retainably engaging said cable attachment body.

6. An optical fiber interconnection system comprising two optical fiber cable assemblies, each cable assembly comprising:
a ferrule having a longitudinal bore therethrough, an optical fiber cable disposed within said bore, a cable attachment body retainably engaging said ferrule therewithin, said ferrule cooperating with said body to resist rotational displacement between said ferrule and said body, and a receptor member retainably engaging said body, and a mating receptacle wherein each said receptor member is retainably engaged by said receptacle to maintain each said ferrule and mating relationship.

7. An optical fiber connector comprising:
a ferrule having a first retention member, a cable attachment body having a second retention member cooperating with said first retention member to retainably engage and prevent rotational displacement between said ferrule and said cable attachment body and, a receptor member retainably engaging said cable attachment body.

8. An optical fiber connector as recited in claim 7, wherein said receptor member retainably engages said cable attachment body in one of a finite plurality of possible rotational orientations.

9. An optical fiber connector as recited in claim 8, the cable attachment body having a shoulder and a polygonal body portion adjacent to the shoulder, the receptor member having a first end having a corresponding polygonal opening therein and a locking latch adjacent to the polygonal opening, the cable attachment body being received in the polygonal opening in the receptor member and said locking latch being engaged to the shoulder on the cable attachment body, the polygonal opening in the receptor member cooperating with the polygonal body portion of the cable attachment body wherein the receptor member retainably engages the cable attachment body in a selected one of a finite number of possible rotational orientations.

10. An optical fiber connector as recited in claim 7, further comprising a plurality of spaced-apart tabs being formed circumferentially on the ferrule, the cable attachment body having a first end, a second end and a longitudinal bore therebetween, a plurality of alternating openings and longitudinal slots being formed in the first end of the cable attachment body, the spaced apart tabs on the ferrule being rotatably oriented with respect to, and received in, said alternating openings and longitudinal slots in the cable attachment body.

11. A method of assembling an optical fiber connector to reduce transverse offset loss in an optical fiber, the connector having a ferrule, the ferrule having an alignment portion adjoining a base, a plurality of spaced-apart tabs being formed at the juncture of the alignment portion and the base, a compression spring disposed about the base, a cable attachment body connected to the tabs to form an assembly with the alignment portion, the base and the compression spring, a plug body, means for rotatably orienting and connecting the assembly to the plug body, the method comprising the steps of:
inserting the ferrule in an opening in a longitudinal bore in the cable attachment body, the ferrule extending outwardly from the cable attachment body, the plurality of tabs on the ferrule being received in a corresponding plurality of alternating openings and longitudinal slots in the cable attachment body, inserting the optical fiber in a longitudinal bore in the ferrule, finishing the optical fiber at an end of the ferrule distal from the cable attachment body, testing the assembly for eccentricity, the cable attachment body having a plurality of spaced-apart retention lugs extending outwardly therefrom, the receptor member having a corresponding plurality of spaced-apart alternating longitudinal cutouts and apertures, attaching the receptor member to the assembly wherein the respective retention lugs are received in the alternating longitudinal cutouts and apertures such that the assembly may be rotatably connected to the receptor member to produce an orientation of the assembly with respect to the receptor member to reduce transverse offset loss.

12. A method of assembling and tuning an optical fiber connector comprising the steps of:

assembling a ferrule in retainable engagement with a cable attachment body to create a ferrule assembly, terminating said ferrule assembly, polishing said ferrule assembly, measuring eccentricity of said terminated and polished ferrule assembly in each of a finite number of possible rotational orientations with respect to reference fiber, and assembling said assembly to a plug body in a one of the finite number of possible rotational orientations having the smallest measured eccentricity with respect to said reference fiber.

13. The method of assembling and tuning an optical fiber connector as in claim 12 and further wherein, said ferrule assembly comprises a ferrule that resists rotational displacement relative to said cable attachment body during the steps of terminating, polishing, and measuring, and further wherein said ferrule resists rotational displacement relative to said plug body subsequent to the step of assembling said assembly to said plug body.

* * * * *